United States Patent [19]

Masoero

[11] 4,317,111
[45] Feb. 23, 1982

[54] DIGITAL DEVICE FOR SYNCHRONIZING AND DECODING CODED SIGNALS

[75] Inventor: Roberto Masoero, Ivrea, Italy

[73] Assignee: Ing. C. Olivetti & C., S.p.A., Ivrea, Italy

[21] Appl. No.: 226,524

[22] Filed: Jan. 19, 1981

Related U.S. Application Data

[63] Continuation-in-part of Ser. No. 28,643, Apr. 10, 1979, abandoned.

[30] Foreign Application Priority Data

Apr. 11, 1978 [IT] Italy .............................. 67796 A/78

[51] Int. Cl.³ .......................................... H03K 13/24
[52] U.S. Cl. .............................. 340/347 DD; 375/110
[58] Field of Search ............ 340/347 DD; 360/40–45; 325/325; 375/110

[56] References Cited

U.S. PATENT DOCUMENTS

| | | | |
|---|---|---|---|
| 3,349,389 | 10/1967 | Simanavicius | 340/347 DD |
| 3,705,398 | 12/1972 | Kostenbauer | 340/347 DD |
| 3,859,655 | 1/1975 | Van Duuren | 340/347 DD |

*Primary Examiner*—Charles D. Miller
*Attorney, Agent, or Firm*—Schuyler, Banner, Birch, McKie & Beckett

[57] ABSTRACT

A digital device generates a local frequency and phase signal adapted for the conversion of one of a plurality of codified signals into binary code. The received codified signals are continuously stored in a shift register which is able to contain the signals received in a predetermined period at a time. The output of the shift-register addresses a memory. At predetermined instances of time the memory produces a control word which is input to a counter dependent on the phase of the received signals stored in the shift register. The counter activates output signals at predetermined instances of time in order to produce a local signal in synchronism with the received signal.

2 Claims, 5 Drawing Figures

DIGITAL DEVICE FOR SYNCHRONIZING AND DECODING CODED SIGNALS

This case is a continuation-in-part of application Ser. No. 28,643, filed Apr. 10, 1979 and now abandoned.

BACKGROUND OF THE INVENTION

The present invention relates to a digital device for synchronizing and decoding phase coded signals.

There are known synchronizing digital devices called phase locked loop devices (PLL), which comprise an oscillator having a frequency multiple with respect to the frequency of the information signal being decoded. The oscillator controls a counter, the output of which indicates the end of the bit period of the information, which controls the synchronization of the received signals. This device requires additional circuitry for decoding these signals.

SUMMARY OF THE INVENTION

According to the invention, it is now provided a digital device for synchronizing and decoding signals received on a communication line, comprising storing means for sampling and storing the logic level of said coded signals, memory means addressed by said storing means for selectively generating control words depending on the phase of said stored coded signals, timing means controlled by said control words for generating timing signals in the proper phase relationship with said coded signals, and decoding means jointly controlled by said control words and said timing signals for generating decoded signals representative of said coded signals.

DESCRIPTION OF THE PREFERRED EMBODIMENT

Figure 1:
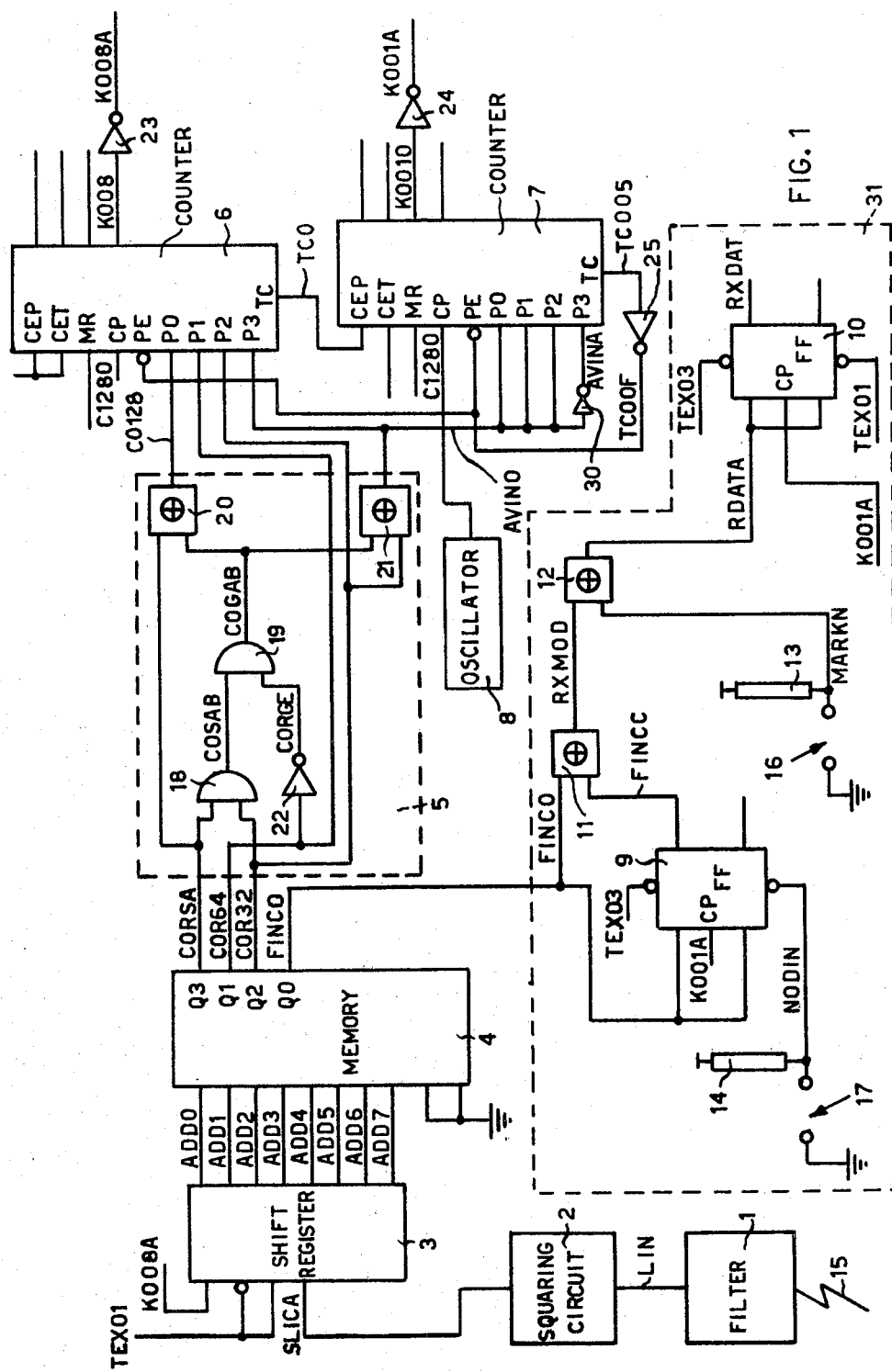
FIG. 1 shows the logical diagram of a device according to the invention.

The circuit of FIG. 1 can be placed into the receiving part of a modem of a communication system. It is adapted to produce a clock signal in synchronism with received information signals in order to decode it. The received signals can be phase encoded in three different codes called hereinafter respectively: not differential, ones differential and zeros differential. The ones differential and zeros differential codes are known also respectively as NRZM (non return zero mark) and NRZS (non return zero space).

The phase codes will be explained afterwards with reference to FIGS. 2, 3 and 4.

In the said codes the logical information is represented by means of predetermined phase displacements (lagging or leading) with respect to the normal transmission frequency.

The circuit of FIG. 1 operates as follows.

A shift register 3, receives an input cyclic information signal to be decoded (the signal SLICA) and samples it periodically; namely the shift register 3 stores logical "ones" and "zeros" in proportion to the lengths of high and low levels of the signal SLICA, thus forming a pattern of binary signals corresponding to the phase of the coded signals SLICA receives during a sampling cycle. The shift register 3 addresses a known memory 4. The memory 4 produces control words which, at any cycle of the receiving signal SLICA, preset suitably the counters 6 and 7.

Such counters 6 and 7 produce basic clock signals K001A having a predetermined frequency with the requisite phase for decoding the information signal SLICA stored in the shift-register 3.

The same memory 4 produces an additional signal FINCO, according to the content of the shift register 3. The signal FINCO will be used for decoding the information signal SLICA.

The coded signals coming from a communication line 15 are properly amplified and filtered by an analogue receiving unit 1, which generates a filtered signal LIN. The signal LIN is sent in input to a zero crossing comparator 2, which produces in output the signal SLICA. This signal is squared and has the proper level for controlling other circuits. The circuits 1 and 2 are already known in the art, therefore they are not described in detail.

The shift register 3 is an eight bit register and is controlled by the timing signal K008A. The signal K008A has a frequency eight times higher than the frequency of the clock signal K001A, which, in turn, in steady condition, should follow the frequency (bit rate) of the received information signal SLICA. For instance, for the information signal SLICA showing at a particular time a high logic level first half-cycle and a low logic level second half-cycle (the first SLICA cycle in FIG. 2) the signal K008A causes the shift register 3 to store the pattern "11110000."

According to the content of the shift-register 3, the memory 4, which is addressed by the output of the shift-register 3, produces a word, formed of the signals CORSA, COR64, COR32 and the additional signal FINCO. The signals CORSA, COR64 and COR32, control a logic circuit 5 which, in turn, produces in output the signals CO128 and AVINO. Particularly the memory 4 can be addressed by the 8 bits to one of 256 locations each one storing a corresponding word and associated signal FINCO. The signals CO128 and ACINO are sent, together with the signals COR64 and COR32, to the inputs of a pair of binary counters 6 and 7 as to selectively preset the starting point of the count, thus advancing or delaying the generation of the clock signals K001A and K001A by a selected time depending on the control word CORSA, COR64, COR32, during the next following sampling cycle.

The logic circuit 5 is adapted to decode the three signals CORSA, COR64 and COR32 for selectively producing commands proper for presetting the counters 6 and 7.

The preset of the counters 6 and 7 is enabled at each clock period K001A by the terminal-count signal TCOOF.

The logic circuit 5 comprises AND gates 18 and 19, exclusive OR gates (hereinafter called EXOR gates) 20 and 21 and a NOT gate 22.

The logic operations performed by the logic circuit 5 are the following: CO128: ((CORSA AND COR32) AND (NOT COR64) (EXOR CORSA) and AVINO: ((CORSA AND COR32) AND (NOT COR64)) EXOR COR32.

The signal CO128 is sent to the preset least significant input P0 of the counter 6, the signal COR64 is sent to the preset input P1 and the signal COR32 is sent to the input P2.

The preset word formed by the signals CO128, COR64 and a COR32 controls the time when the clock signal K001A must be set. In particular, the signal C0128 can advance or delay the said time by 1/128 with respect to a normal K001A period; the signal COR64 can advance or delay it by a 1/64 and the signal COR32 by 1/32.

The signal AVINO is sent to the preset most significant input P3 of the counter 6 in order to select the lag (AVINO=1) of the clock signal K001A.

The signal AVINO at the preset input P3 of the counter 7, which is the reverse of the signal AVINO being produced by the NOT gate 30, is sent to the preset input P3 of the counter 7 to select the lead (AVINO=0) of the clock signal K001A.

The table 1, which follows, shows in detail the correspondence of the signals CORSA, COR64 and COR32 with the bit pattern, which preset the counter 6 and 7, and with the lead or lag, produced on the signals K008A and K001A.

The signals K008A and K001A correspond to the signals K008 and K0010 produced by the counters 6 and 7 respectively and reversed by the NOT gates 23 and 24.

K0010 and is reversed by the gate 23 to produce the clock signal K008A.

Each time the counter 7 sets its own terminal count TC005, the counters 6 and 7 are enabled, in a known manner, to be preset by the signals at input pins P0–P3 of both counters in a manner better explained hereinafter. The memory 4 is addressed by the ADD0–ADD7 patterns corresponding every time to the SLICA signals contained in the shift register 3 and produces at the outputs Q0–Q3 the correspondent signals FINCO, COR32, COR64 and CORSA. The last three control the preset operations at predetermined times. Referring to FIGS. 2-4, each preset operation of the counters 6 and 7 occurs in correspondence of a vertical line marked on those diagrams. The SLICA signals stored in the shift register 3 at the time of the preset are those received in the period immediately preceding each cited vertical line.

Let us consider the ideal condition of synchronism between the running of the counters 6 and 7 and the incoming SLICA signals shown in FIG. 1. It is clear from the SLICA diagram that at the time of preset the SLICA signals stored in the shift register 3 and thereby the signals ADD0–ADD7 addressing the memory 4 show a perfect geometric pattern of the types: 11110000 or 00001111. The correspondent cells addressed are, of course, programmed in obvious manner to produce on the outputs of CORSA, COR64 and COR32 the pattern

TAB. 1

| MEMORY 4 | | | COUNTER 7 | | | | COUNTER 6 | | | | CORRECTION OF THE CLOCK SIGNAL |
|---|---|---|---|---|---|---|---|---|---|---|---|
| CORSA | COR64 | COR32 | P3 | P2 | P1 | P0 | P3 | P2 | P1 | P0 | |
| 0 | 1 | 0 | 0 | 1 | 1 | 1 | 1 | 1 | 0 | 0 | 1/32 ⎫ |
| 0 | 1 | 1 | 0 | 1 | 1 | 1 | 1 | 1 | 1 | 0 | 1/64 ⎬ lag |
| 1 | 1 | 1 | 0 | 1 | 1 | 1 | 1 | 1 | 1 | 1 | 1/28 ⎭ |
| 0 | 0 | 0 | 1 | 0 | 0 | 0 | 0 | 0 | 0 | 0 | IN PHASE |
| 1 | 0 | 0 | 1 | 0 | 0 | 0 | 0 | 0 | 0 | 1 | 1/28 ⎫ |
| 0 | 0 | 1 | 1 | 0 | 0 | 0 | 0 | 0 | 1 | 0 | 1/64 ⎬ lead |
| 1 | 1 | 0 | 1 | 0 | 0 | 0 | 0 | 1 | 0 | 0 | 1/32 ⎭ |

The counters 6 and 7 are cascaded, namely they work as one single binary counter which can be preset from 0 to 255.

The count signal C1280 has a frequency 128 times higher than the clock signal K001A (or the bit rate of the information signal SLICA). More particularly, the counters 6 and 7 are common 4 bit presettable counters. The counters 6 and 7 are cascaded and work in a known manner as one single binary counter. For example, these counters 6 and 7 may be counters manufactured by Fairchild Industries, Inc. having prior configurations identified in data sheets 340.160, 340.161, 340.162 and 340.163. The clock signal C 1280 has a frequency nearly 128 times faster than the bit rate of the information signal SLICA. Every 16 pulses of the signal C 1280, the counter 6 enables, through its terminal count output TC0, the count enable CEP of the counter 7 so as to enable the counter 7 to be clocked one time by the signal C 1280. Briefly, as anyone skilled in the art knows, after 64 pulses of the signal C 1280, the output K0010 is set and after 64 further pulses it is reset, so that, in absence of any preset in operation, the clock signal K001A, correspondent to the signal K0010 reversed by a gate 24, represents a regular squared waveform, having a frequency 128 times slower than C 1280, i.e. a frequency nearly equal to the bit rate of the input information contained in the waveform SLICA. An output K008 represents a signal 8 times faster than the output 000 representing (see Table 1) the condition of no correction of the clock signals. Analogously, a lead or lag of the SLICA signals stored in the shift register 3, with respect to the time of preset, is revealed by a distortion of the cited patterns: for example, 11100000 or 00011111 instead of the first and of the second pattern respectively. All the possible patterns ADD0–ADD7 address as many memory cells programmed to produce the necessary outputs CORSA, COR64 and COR32 disclosed in Table 1.

It should be evident that the elements 4-7 of FIG. 1 form a digital circuit for synchronizing two signals (SLICA and K001A), which has the advantage that it is flexible and suitable for any work frequency on condition of storing a proper program into the memory 4 and using an oscillator 8 having the required frequency. A further advantage of the present combination of the shift-register 3 sampling the incoming SLICA signal with the memory 4, is that the memory cells addressed by the content of the shift-register 3 are such as to produce the memory output signal FINCO adapted to control the decoding circuit 31 whatever is the transmission code employed.

The memory 4 produces the signal FINCO according to the following rule: an EXOR logic operation is executed between the ADD0–ADD7 pattern, stored into the shift register 3 and addressing the memory 4, and a fixed or reference comparison pattern "11110000" corresponding to a comparison logic signal formed of a first half signal having a high level representing the pattern "1111" followed by a second half signal having a low level representing the pattern "0000".

If the ADD0-ADD7 pattern is "11110000", namely the bits stored into the shift-register 3 are exactly correspondent to the comparison pattern bits, then the signal FINCO is reset to "1" logic level.

Figure 5:
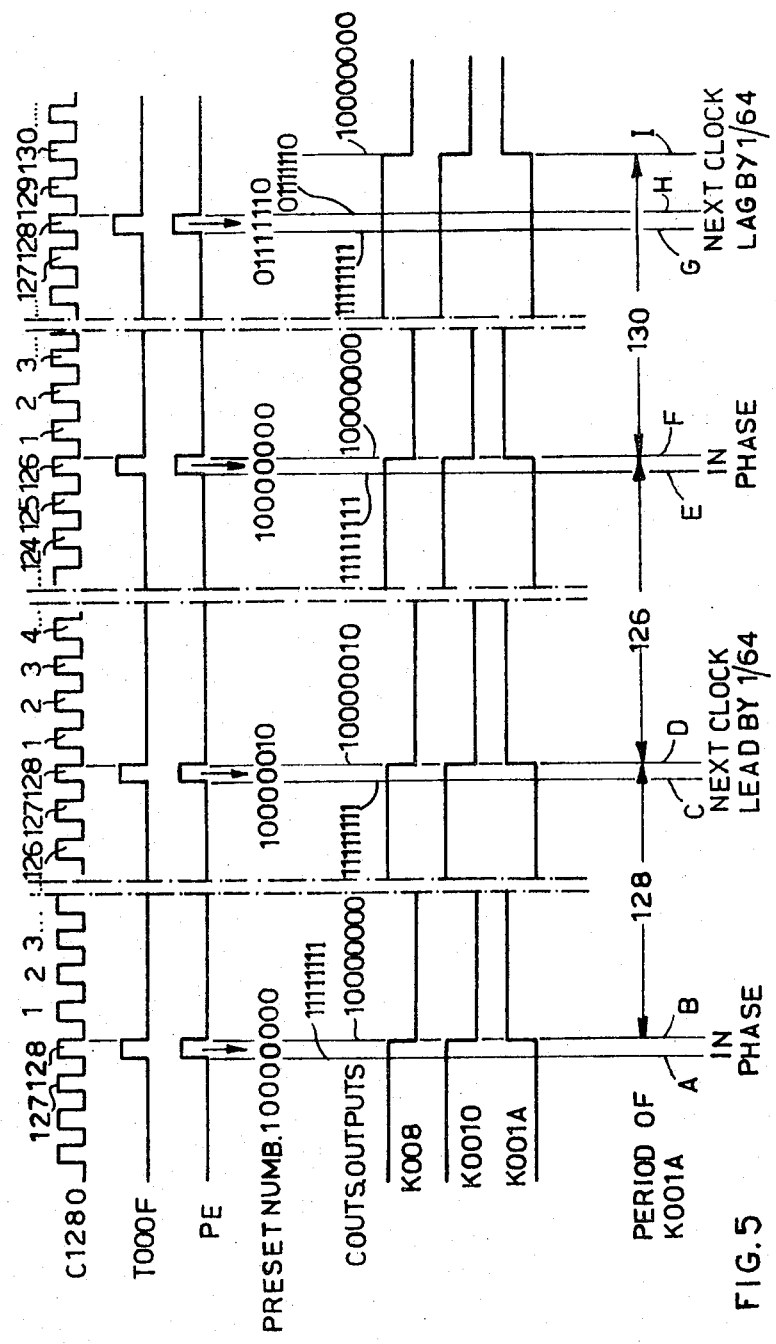
FIG. 5 shows timing diagrams for the device of FIG. 1.

If the ADD0-ADD7 pattern is "00001111", then all the bits are reversed with respect to the comparison corresponding bits and the signal FINCO is set at "0" logic level.

timing of clock signals is further clarified by the diagrams of FIG. 5.

The various addresses on the left column of table 2 select 4 bit cells of the memory; the content of each cell selected is obviously that indicated by the four memory pins CORSA, COR64, COR32 and FINCO. In the column ADD0-7 of table 2, a few exemplary patterns are disclosed that can be input to the memory 4 at the time the terminal count TC005 enables presetting of the counters 6 and 7, thereby allowing the pins CORSA, COR64 and COR32 to effectively preset the counters 6 and 7.

TAB. 2

| ADD0-7 | CORSA | COR64 | COR32 | EQUALITIES WITH 00001111 | NEXT CLOCK CORRECTION | FINCO |
|---|---|---|---|---|---|---|
| 00001111 | 0 | 0 | 0 | 8 | 0 | 0 |
| 00001011 | 0 | 0 | 0 | 7 | 0 | 0 |
| ← 00011111 | 0 | 0 | 1 | 7 | 1/64 ⎫ LEAD | 0 |
| ← 00011110 | 0 | 0 | 1 | 6 | 1/64 ⎭ | 0 |
| 11110000 | 0 | 0 | 0 | 0 | 0 | 1 |
| 11110010 | 0 | 0 | 0 | 1 | 0 | 1 |
| ← 11111000 | 0 | 1 | 1 | 1 | 1/64 ⎫ LAG | 1 |
| ← 01111100 | 0 | 1 | 1 | 2 | 1/64 ⎭ | 1 |

In intermediate cases, the signal FINCO's logic level is chosen according to a majority (or probability) rule. For instance, a "11111100" pattern, compared with the "11110000" pattern, resets the signal FINCO to "0" logic level, since the equalities between correspondent bits are six, while the inequalities are two.

The "0" logic level or the "1" logic level of the signal FINCO indicates, at any moment, the phase of the information signal SLICA (FIGS. 2-4), which continually runs into the shift register 3: namely the signal FINCO shows whether the said phase is nearer to the comparison logic signal or to the reverse of this comparison signal. It is evident that the additional signal FINCO, defined according to such majority rule, is adapted to control a decoding unit 31.

The memory 4 can set or reset the signal FINCO in output at any period of the signal K008A which clocks the shift register 3. However, as described below, the signal FINCO is enabled to control the decoding unit 31, only in correspondence with the up transitions of the clock signal K001A. The decoding unit 31 comprises decoding means formed by a plurality of logic elements, i.e. flip flops 9 and 10 and gates 11 and 12, which are selectively settable through corresponding resistors 13 and 14 for generating decoded signals. Particularly, the decoding unit 31 comprises means operable for generating code selecting signals. These means include a pair of presettable switches 16 and 17 better explained hereinafter. With reference to FIGS. 1-4, there is now described the decoding of the signal SLICA, when received in the different codes, i.e. "not differential", "ones differential" and "zeros differential."

Table 2 below shows a kind of memory program which clarifies the relationship between the lag or lead of the SLICA signals stored in the shift register 3 of FIG. 1 and consequent control words CORSA, COR64, COR32 and FINCO of the memory 4. Each control word produces, through the logic circuit 5 of FIG. 1, correspondent preset signals input to pins P0-P3 of each counter 6 and 7 as listed in table 1. These signals will be called "preset numbers". Finally, the effect produced by different "preset numbers" on the The first four lines in the above table 2 illustrate cases when the signal FINCO is interpreted as "0". The first line illustrates a condition of perfect synchronism between the input SLICA signals and the clock K001A or K008A at the time when a preset operation occurs: no correction is thereby necessary on the clock signal phase. The second line illustrates the same conditions as the first line but with a random error: a "0" has been received in place of a "1": no correction is necessary in timing the clock signals and the pattern is still interpreted as in the first line. If we assume that the bits of the shift-register 3 which correspond to the pins ADD-0-7 are running to the left, as indicated by the arrows in table 2, it is apparent that in lines 3 and 4 of table 2, the terminal count signal, and thereby all the clock signals, are slightly late with respect to the phase of the SLICA signal sampled in the shift register 3: the memory outputs CORSA, COR64 and COR32 are adapted to produce a lead or to quickly generate the next clock pulses (see also table 1 for the logic levels of the various relevant signals).

Lines 4-8 of table 2 analogously illustrate a few cases when the signal FINCO is interpreted as "1". Lines 7 and 8, in particular, illustrate two situations in which the preset operation occurs slightly faster with respect to the running of the signal SLICA in the shift register 3, so the memory is programmed to produce a "lag" or "to delay" the generation of future clock pulses.

With reference to the time diagrams of FIG. 5, nine vertical lines A-I indicate predetermined instants of time in which predetermined numbers are outputted by the counters 6 and 7 which in turn causes correspondent logical operations. In particular, the instants of time B, D, F and I indicate the times when the clock signal K001A rises and corresponds in FIG. 2 to the instants of time marked by vertical lines. Obviously, in FIG. 2, all the periods of the signal K001A have been drawn as equivalent, while a few cases are shown with reference to FIG. 5 when they are not.

At the instant A, the counter outputs the number "11111111" as indicated by the label "COUNT OUTPUTS". The number "11111111", as in most known counters, causes the pin "terminal count" TC00F of FIG. 1 to be set (second line of FIG. 5) and to set in turn the pins of "preset enable" PE (third line of FIG. 5) of the two counters. We assume that at the instant A the SLICA signals stored in the register 3 of FIG. 1 are in the proper phase with the clock signal. In this condition, it is clear from table 1 that a number 10000000 is chosen. This number, as shown in the diagram "PRESET NUMB." of FIG. 5, is preset in the time between the instant A and the instant B.

At the instant B, the preset number 10000000 is output from the counters 6 and 7 (see again the line COUNT OUTPUTS). In this condition, all the output pins of the counters are at low logic level with the exception of the pin producing the signal having the weight $2^7$, which is the last pin of the counter 7 towards the bottom of FIG. 1. The signals K008 and K010 output by the counters 6 and 7 have the weights $2^3$ and $2^6$, respectively and are thereby reset at low logic level while the signal K001A is obviously set at high logic level, as clearly shown in the correspondent diagrams of FIG. 5. The number 10000000 preset into the counters causes the next terminal count signal TC00F (or next output equal to 11111111) after exactly 128 periods of the signal C1280 of FIG. 1. The signal C1280 is the clock signal of the counters and is shown in the first timing signal of FIG. 5. Of course, after 64 pulses of C1280, i.e. at the time between the instants B and C, the output of the counter will be 11000000 (not shown in the drawings) which sets the signal K0010 and resets the signal K001A.

At the instant C, the preset enable PE is set again. We suppose now that at the instant C, the SLICA signal stored in the shift register 3 appears to be fast with respect to the clock signals: the situation considered is that of the third line of table 2. From table 2, 3rd line and from table 1 it is apparent that the preset number this time is 10000010. As in the preceeding situation, the preset number appears at the output of the counters at the instant D, producing, in a known manner, the transitions of the clock signals shown in FIG. 5. Since the number preset at the instant C is larger by two units than the number preset at the instant A, the terminal count will be set at the instant 3 after only 126 periods of the signal C1280, thereby introducing a "lead" in the operations of instants E and F as to the phase of the clock signals relative to the SLICA signals. This lead corresponds, in the example chosen, to a time equal to two periods of the signal C1280, i.e. to 1/64 of the standard period of the signal K001A. The preset operation of instant E is of the same kind as at the instant A, since we assume again that the SLICA signal and the clock signals are properly phased. Therefore, at the instant F the output of the counters is again 10000000. Obviously, the next terminal count signal TC00F at the instant G is set once again after 128 periods of the signal C1280.

At the instant E, we assume that the SLICA signals stored in the shift register 3 are late with respect to the clock signals. The case examined this time is that of the 7th line of table 2. Referring also to table 1, the preset number is 01111110. This number is output to the counters at the instant H and has the effect of delaying the transitions of the clock signals in a manner explained below. It must be pointed out that the output pins of the counters producing the signals having weight $2^3$ and $2^6$, i.e. the signals K008 and K010, respectively, are still kept by the output 01111110 at high logic level. After two more periods of the signal C1280, at the instant I, the output of the counter becomes 10000000, thereby resetting in known manner the clock signals K008 and K010 and setting correspondingly the clock signal K01A. The result in this instance is that the transitions of all the clock signals are produced at the instant I: 120 periods of the signal C1280 after the corresponding transitions at the instant F, thereby delaying or introducing a "lag" in the clock signals at 1/64.

Figure 2:
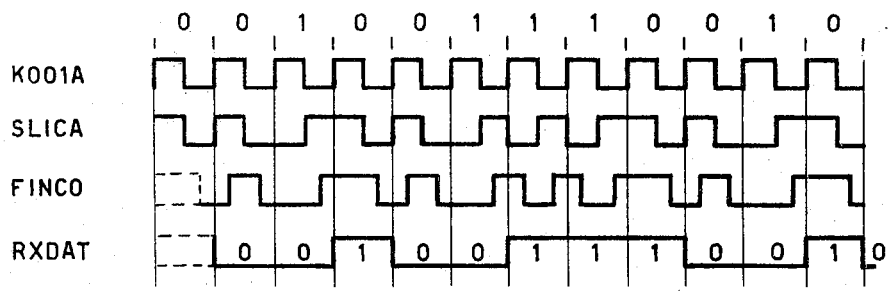
FIG. 2 shows the waveforms relating to the decoding of information signals belonging to a first code.

An example of decoding a "not differential" code is shown in FIG. 2. In this code, the information signal SLICA shows an up or down transition (namely two possible phase conditions) within the limits of a clock cycle (K001A): in the first case it represents a logical "1", in the second case it represents a logical "0".

The switches 16 and 17 (FIG. 1) are preset to connect resistances 13 and 14, connected to the constant high logic level T, are excluded. The signals FINCC, and MARKN are thereby at low logic level, whereby the EXOR gates 11 and 12 let the signal RXMOD copy the signal FINCO, and the signal RDATA copy the signal RXMOD, respectively, thereby FINCO=RXMOD=-RDATA (FIG. 2).

The flip-flop 10 (FIG. 1) sets the output signal RXDAT (FIG. 2) according to the value of the signal RDATA (=FINCO) at an instant controlled by the up transition of the clock signal K001A, which is properly phased with respect to the information signal SLICA. The signal RXDAT indicates therefore which of said two phase conditions characterizes the signal SLICA stored into the shift register 3 during the last cycle of the clock signal K001A, and shows the presence of a logic "1" or a logic "0". Since the signal RXDAT within the limits of the cycles of the clock signal K001A shows directly the presence of logic "0s" or "1s" in the received information signal SLICA, the signal RXDAT represents the decoded binary information.

It is important to point out that the clock signal K001A may not be perfectly synchronized with the signal SLICA, as it is shown in the case of FIG. 2, which represents the steady condition.

In such cases, the cycle of the signal SLICA stored into the shift register 3 in correspondence of the up-transition of the clock signal K001A, can show exactly neither of the phase conditions previously described. Anyway the majority rule used for defining the logic level of the signal FINCO allows that the information contained in the signal SLICA is correctly interpreted even in case of not perfect synchronism: theoretically, a phase different till 90° ($\frac{1}{4}$ cycle) can be allowed, but practically a phase difference less than 45° ($\frac{1}{8}$ cycle) reduces the decoding errors to less than $10^{-7}$.

Figure 3:
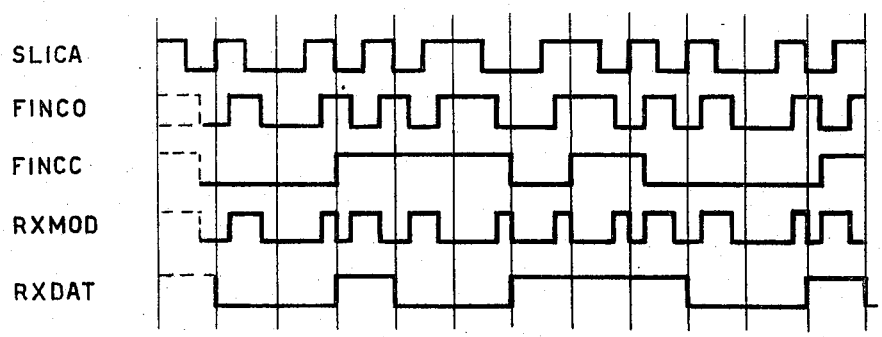
FIG. 3 shows the waveforms relating to the decoding of information signals belonging to a second code.

In FIG. 3, the information signal SLICA represents, in the code "ones differential", the same binary pattern as in FIG. 2. As before, the signal SLICA shows a transition at the middle of each cycle of the clock signal K001A, but its frequency results to be the half, when logic "1s" are coded.

In this case, only switch 16 is preset to connect the resistance 13 to the ground, so that the signal NODIN is at high logic level and the signal MARKN at low level. The flip-flop 9 is thereby enabled and sets in output the signal FINCC (FIG. 3) according to the logic level of the signal FINCO, at an instant controlled by the up transition of the clock signal K001A. The signal FINCC controls, together with the signal FINCO, the EXOR gate 11 (FIG. 1) so as to produce the signal RXMOD.

Since MARKN=0, the EXOR gate 12 let the signal RDATA copy the signal RXMOD.

The signal RXDAT, produced by the flip-flop 10 controlled by the signal RDATA (=RXMOD) and by the clock signal K001A, represents (FIG. 3) even in this case the desired decoded information.

Figure 4:
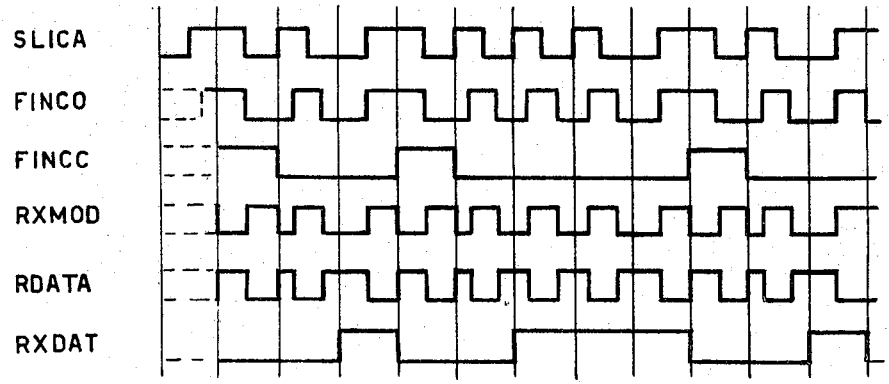
FIG. 4 shows the waveforms relating to the decoding of information signals belonging to a third code.

If neither of the switches 16 and 17 is preset, the circuit of FIG. 1 is enabled to decode the code "zeros differential" (FIG. 4). This case is the dual with respect to the previous one: the signal SLICA shows half the frequency when logic "0s" are coded.

The signal RXMOD is now reversed by the EXOR gate 12, connected to MARKN high logic level. The signal RXDAT (FIG. 4) is again the decoded information signal desired.

In view of the preceding description, it is clear how the circuit of FIG. 1, through the basic clock signal generated upon receiving a predetermined coded signal, controls both the decodification of the received coded signals and the sampling of the next following coded signals, thus synchronizing and decoding information signals of one of a plurality of different codes, the choice of the three codes being merely illustrative. By introducing very simple alterations in the device, i.e. in the program of the memory 4 or in the decoding unit 31, other codes can be synchronized and decoded by the device. The only limitation is that the rules, which the information signals are transmitted according to, must be such as to assure the presence of at least one logic transition of the coded signal SLICA for every cycle of the clock signal K001A. In this condition, the synchronism between the two signals can always be obtained.

The device according to the invention can apply, for instance, to several NRZ (non return zero) codes following the rules already mentioned, or in general to any case when problems arise about synchronism between the clock of the receiving devices and the received information signals.

Both synchronization and decoding are accomplished in the disclosed device only by a memory 4, addressed by the shift register 3. The selectively presettable switches 16 and 17 adapt the decoding unit 31 to the received code (SLICA). The counters 6 and 7, controlled by the logical circuit 5, determine the proper phase of the clock signal K001A for the synchronization.

All improvements or modifications, which those skilled in the art may carry out from the present description, are understood to be within the scope of the present invention as claimed.

I claim:

1. In a communication receiving apparatus having receiving means for receiving signals from a communication line, the signals being coded in phase and having approximately a predetermined frequency, a digital device for decoding the coded signals so received comprising:

an oscillator for generating a periodic signal;

counting means connected to said oscillator for generating a basic clock signal having the predetermined frequency upon receiving predetermined plurality of the periodic signals, said counting means generating a further clock signal having a frequency which is a multiple of the predetermined frequency according to a predetermined number;

sampling means cyclically controlled by the further clock signal for repeatedly sampling the received coded signals according to the multiple frequency, said sampling means including a shift register for storing, in each sampling cycle, a number of logic levels equal to the predetermined number and forming a pattern of binary signals corresponding to the phase of the coded signals received during an interval of time between two subsequent basic clock signals;

memory means addressed by the pattern of binary signals for generating a control word representative of the pattern for indicating, in synchronism with the base clock signal, the lag or lead of the last received signal with respect to the base clock signal and for generating an additional control signal representative of particular information in accordance with the last received signal, defined according to a majority rule applied to the binary signals in comparison with a pair of opposite reference patterns, the control word selectively presetting said counting means at the end of each count to advance or delay the generation of two clock signals by a selected time, dependent on the control word, during the next following sampling cycle; and decoding means jointly controlled by the additional signal and the basic clock signal of the next following sampling cycle for generating a decoded signal representative of the received coded signals, so the basic clock signal generated upon receiving predetermined coded signals controls both the decodification of the received coded signal and the sampling of the next following coded signal.

2. A digital device according to claim 1, wherein said decoding means decodes signals coded according to one of a number of different phase codes, said decoding means comprising:

a plurality of logic elements selectively settable for generating decoded signals according to the phase code required for the communication;

manually operable means for generating selection signals; and means responsive to the combination of the selection signals for selectively setting said logic elements.

* * * * *